INVENTOR
Herman T. Kraft

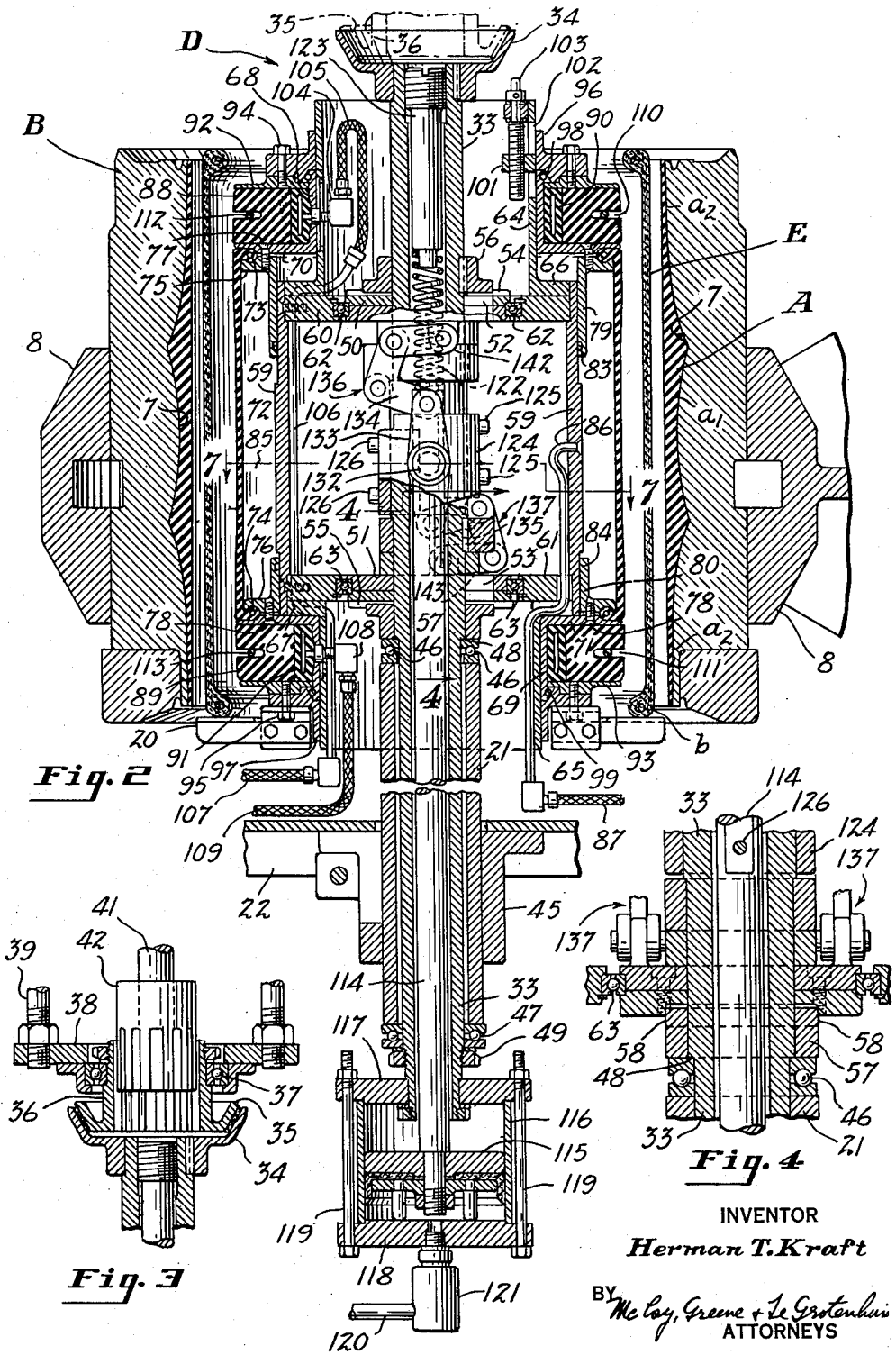

INVENTOR
Herman T. Kraft
BY McCoy, Greene & te Grotenhuis
ATTORNEYS

United States Patent Office 2,974,714
Patented Mar. 14, 1961

2,974,714

METHOD AND APPARATUS FOR APPLYING AN UNCURED RUBBER COVERING TO A TIRE CARCASS

Herman T. Kraft, Akron, Ohio, assignor to The General Tire & Rubber Company, Akron, Ohio, a corporation of Ohio Filed Oct. 9, 1958, Ser. No. 766,245

15 Claims. (Cl. 154—9)

This invention relates to the building of pneumatic tires by the method disclosed in Kraft Patent 2,614,056, granted October 14, 1952, and more particularly to an improved method of and apparatus for transferring an uncured rubber covering band from the interior of a tubular mold member to the exterior of a tire carcass.

In building tires by the method of said patent an internally cylindrical carcass covering band of rubber having a central tread forming portion and side wall covering end portions thinner than the tread portion is molded in an annular cavity formed between a cylindrical core and a tubular outer mold member having a circumferential recess that conforms to the exterior face of the central tread forming portion of the band. The band is extracted from the mold by positioning a substantially cylindrical drum built tire carcass within a tubular mold member having a molded covering band therein, expanding the carcass by fluid pressure into engagement with the band to adhere the band to the carcass and releasing the pressure on the tire carcass to allow the carcass to contract and free the adhered band from the recessed mold member.

The present invention provides a method of extracting the covering band from the interior of the tubular mold member and applying it to a tire carcass by which uniform and complete adhesion of the covering band to the tire carcass is effected, by which complete freeing of the mold band from the interior of the tubular mold member is assured, and by which removal of the molded band is accomplished without marring its external surface.

In accordance with the present invention the tire carcass is expanded by means of a pressure applying member that is of normally cylindrical shape and of a diameter substantially less than the internal diameter of the tire carcass, the pressure applying member having a centrally disposed normally cylindrical, flexible and elastic peripheral wall extending throughout the major portion of its length that is sufficiently stretchable to be expanded by internal fluid pressure to press the tire carcass radially outwardly against the major portion of the interior of the molded band with sufficient radial pressure to strongly adhere the carcass to the molded band. After the peripheral wall of the pressure applying member is expanded to adhere the tire carcass to the molded covering band, adhesion between the molded band and the mold member is relieved by shifting the pressure applying member laterally within the mold member to position its axis laterally of the axis of the mold member, after which the pressure applying member is actuated to move its axis orbitally about the axis of the mold member while the fluid pressure acting on the expanded peripheral wall is gradually relieved so that radially inwardly directed forces are applied to the molded band progressively about its circumference to relieve adhesion between the band and mold member. After a few orbital revolutions the pressure applying member is returned to a position coaxial with the mold member and the fluid pressure acting on the peripheral wall is further reduced to contract the tire carcass and adhered band sufficiently to permit withdrawal axially from the mold.

In order to insure better adhesion between end portions of the tire carcass and the covering band, the said end portions are preferably expanded independently of the central portion and the pressure on the end portions is controlled independently of the pressure on the central portion. To stitch the end portions of the molded band to the tire carcass, auxiliary flexible expansible bands on the pressure applying member are engaged interiorly with the end portions of the tire carcass and are expanded by fluid pressure controlled independently of the central peripheral wall which is the main pressure applying member during the orbital movement of the pressure applying member, to adhere the end portions of the covering band to the tire carcass and to relieve adhesion between the end portions of the molded band and the molded member.

Reference should be had to the accompanying drawings forming a part of this specification, in which:

Fig. 2 is a vertical, axial section through the extractor and a mold member within which it is positioned;

Fig. 3 is an axial section through the friction drive connection between the drive shaft and the extractor shaft;

Fig. 4 is an axial section on an enlarged scale taken on the line indicated at 4—4 in Fig. 2;

Figure 1:
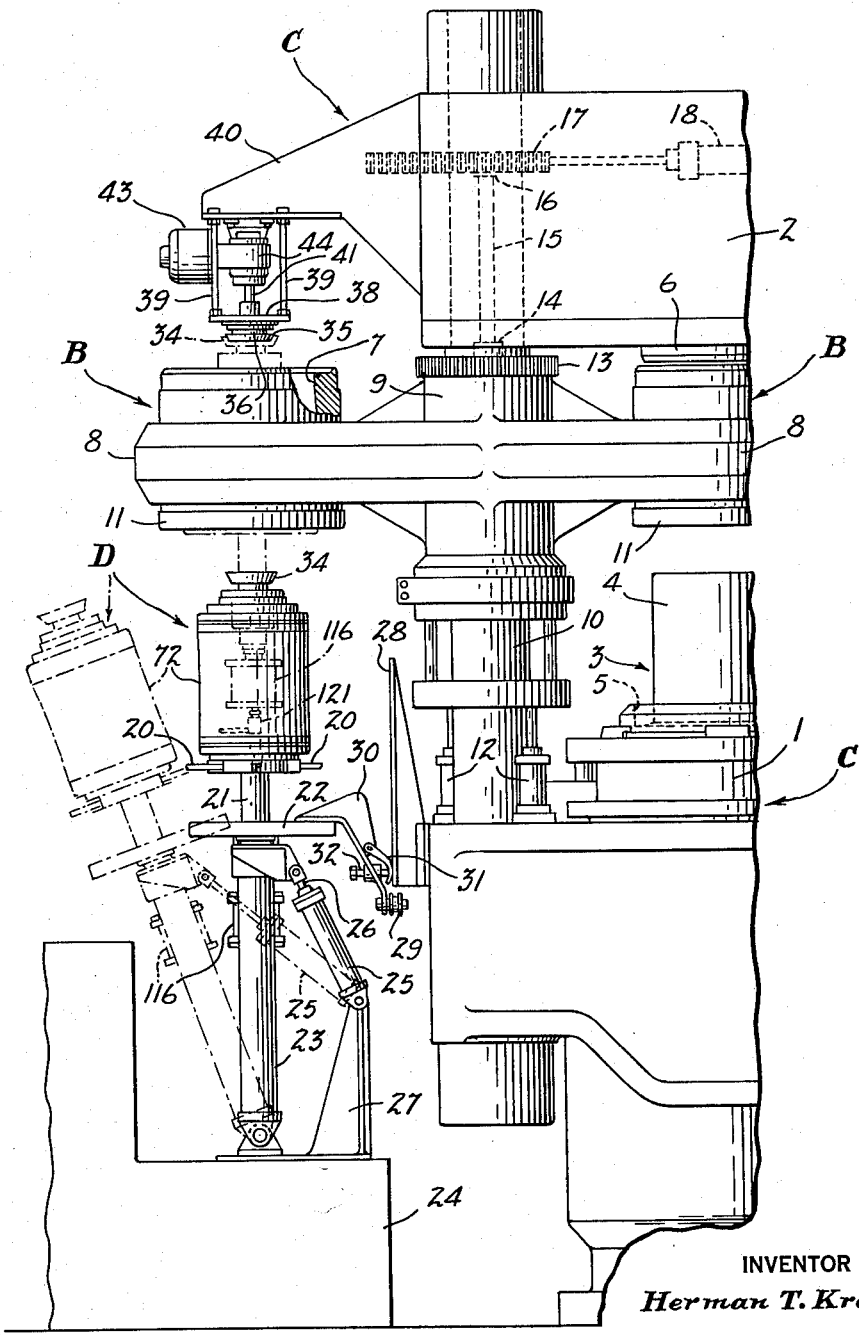
Figure 1 is a fragmentary side elevation showing the molding press and extractor.
Figure 5:
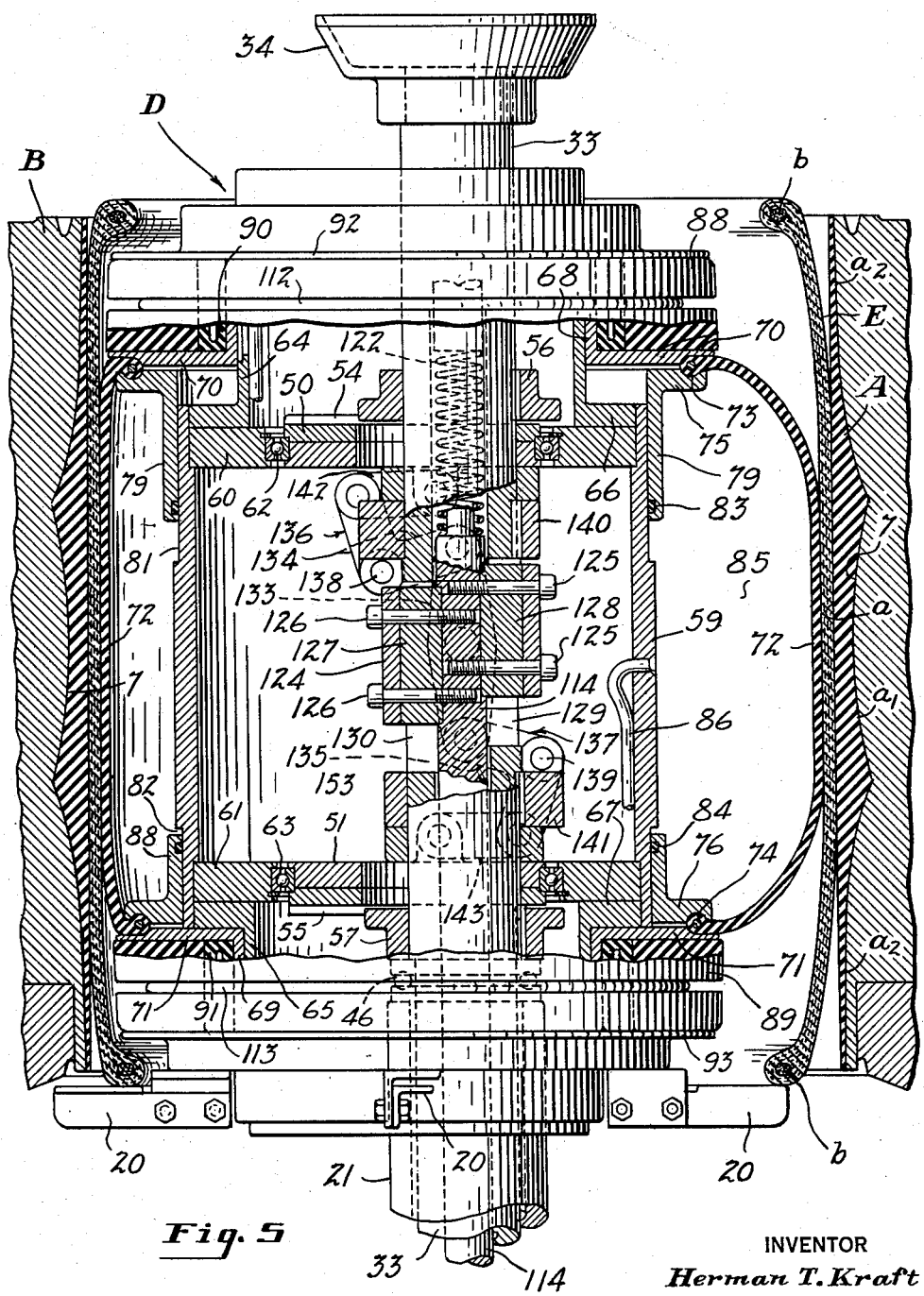
Fig. 5 is an axial section showing the expansible pressure applying drum adjusted to a position in which its axis is offset laterally with respect to the drive shaft.
Figure 6:
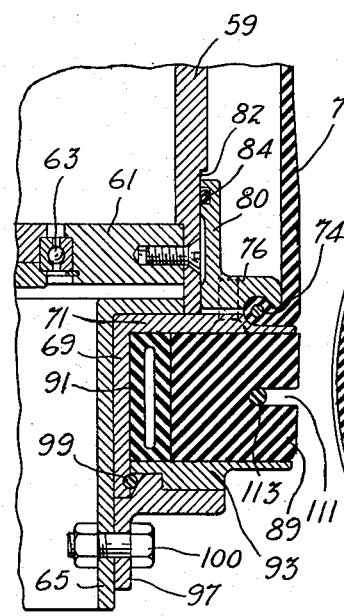
Fig. 6 is a fragmentary vertical section on an enlarged scale through the lower expansible stitcher band.
Figure 7:
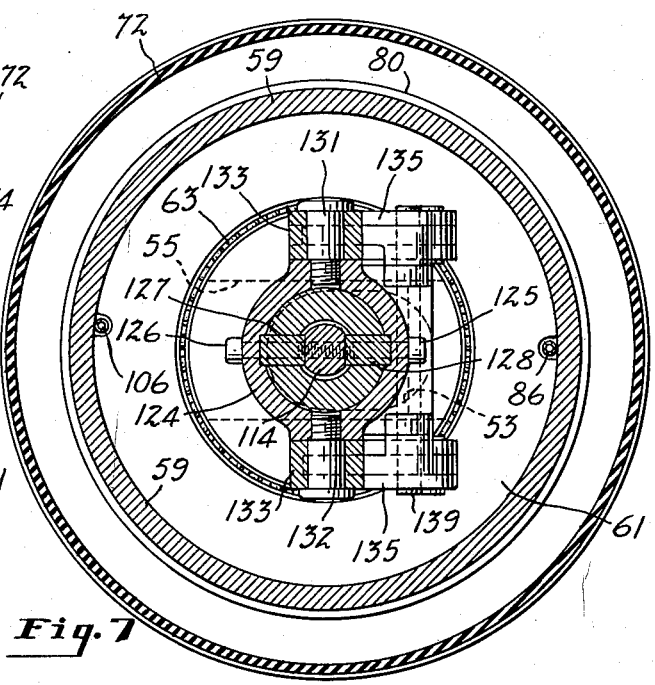
Fig. 7 is a horizontal section through the pressure applying drum taken on the line indicated at 7—7 in Fig. 2.
Figure 8:
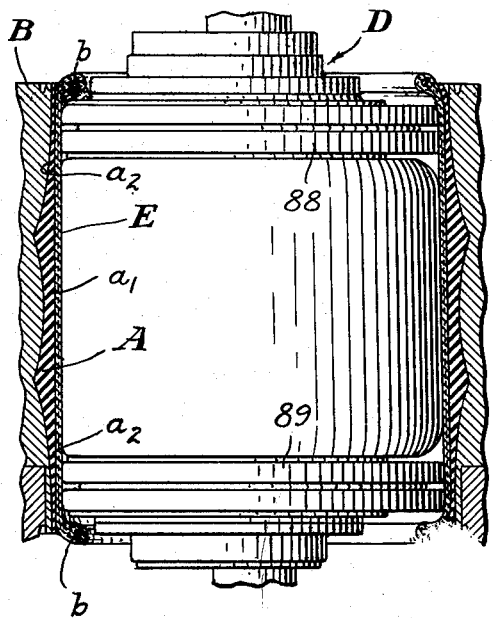
Fig. 8 is a vertical section showing the pressure applying drum offset laterally with respect to the drive shaft and fully extended.
Figure 9:
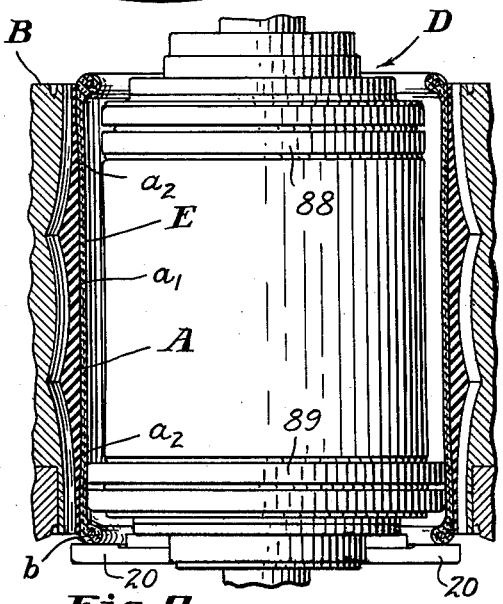
Fig. 9 is a vertical section showing the pressure applying drum deflated and positioned centrally for removal from the tubular mold member.

As illustrated in the accompanying drawings, an uncured rubber covering band A having a substantially cylindrical interior face $a$, a tread forming central portion $a^1$ and side wall covering end portions $a^2$ is formed within a tubular mold member B as shown in Figs. 2 and 5. As shown in Fig. 1, the mold member B is transferred from the molding press C to a position above an extractor D which receives a substantially cylindrical drum built tire carcass E and moves with the tire carcass axially into the tubular mold member, after which the extractor is manipulated as will be hereinafter described, to adhere the molded covering band to the exterior of the tire carcass and free it from the interior of the mold.

As shown in Fig. 1, the mold press C has a movable lower platen 1 and a stationary head 2. A lower mold member 3 is attached to the platen 1 and carries a vertically disposed cylindrical core portion 4 and an annular rubber receiving trough 5 surrounding the lower end of said core portion. A closure plate 6 is attached to the head 2 directly above the core 4 for closing the upper end of the mold member B during the molding operation. The mold members B have an internal recess 7 to receive the tread forming portion $a^1$ of the band A and the mold members B are mounted in arms 8 of a turret 9 rotatably mounted on one of the head supporting posts 10 and are movable from a molding position in alinement with the core 4, to an extracting position above the extractor D which is mounted at one side of the press C. The lower end 11 of each mold member B is formed to provide an annular plunger that fits in the annular trough 5 to force rubber placed in the trough 5 into the mold cavity formed between the core 4 and the interior of the mold member B.

The turret 9 is lifted by means of cylinders 12 to engage a mold member B with the closure plate 6 prior to each molding operation and to lower the turret 9 clear of the plate 6 after the molding operation. Rotary movement is imparted to the turret 9 after each molding operation to transfer the mold B with a covering band therein to a position over the extractor D, this movement being imparted by means of a spur gear 13 on the turret 9 that meshes with a pinion 14 on a vertical shaft 15 which has a pinion 16 engaged by a rack 17 that is moved horizontally by means of a cylinder 18 to turn the shaft 15 and index the turret.

The extractor D supports a tire carcass E on radially projecting arms 20 and is provided with a supporting post 21 that is attached to a crosshead 22 supported on the upper ends of alined cylinders 23 that are pivoted at their lower ends to a base 24. The extractor D is movable about the alined pivots at the lower ends of the cylinders 23 from the vertical position shown in full lines in Fig. 1 to the inclined position shown in dotted lines by means of a cylinder 25 and piston 26 that connect the crosshead 22 to a bracket 27 attached to the base 24. The tire carcass E is placed on the extractor when it is in the inclined position and is movable axially with the extractor into an alined mold member B when in vertical position. The extractor D is guided during its vertical movement by means of a guide plate 28 attached to the press and a grooved roller 29 carried by a bracket 30 attached to the crosshead 22. When the extractor is moved to vertical position the roller 29 is brought into a position below and in vertical alinement with an edge of the plate 28, proper alinement being obtained by means of a stop member 31 that is adjustable by means of a screw 32. The extractor D is mounted on a shaft 33 which projects above the upper end of the extractor and carries a conical friction clutch member 34 that engages with a complementary clutch member 35 when the extractor is in its uppermost position.

As best shown in Fig. 3, the clutch member 35 is carried at the lower end of a short tubular shaft 36 that is journaled in a ball bearing 37 in a supporting plate 38 that is adjustably supported by means of tie bolts 39 suspended from a bracket 40 on the head 2 of the press. A vertical driving shaft 41 is connected by a spline 42 to the tubular shaft 36 and is driven by a motor 43 through suitable gearing in a reduction gear housing 44.

The tubular post 21 is adjustably secured to the crosshead 22 by means of a clamping collar 45 and the actuating shaft 33 is journaled in ball thrust bearings 46 and 47 at the upper and lower ends of the tubular post 21. The upper bearing 46 is disposed between the upper end of the post 21 and a shoulder 48 on the shaft 33 and a nut 49 on the shaft 43 clamps the lower bearing 47 to the lower end of the post 21. Upper and lower disks 50 and 51 are mounted on the shaft 33 above the upper bearing 46 to rotate therewith. The disks 50 and 51 are adjustable laterally of the shaft 33, being provided with parallel radial slots 52 and 53 that receive the shaft 33. A radial groove 54 on the top face of the upper disk 50 and a radial groove 55 on the bottom face of the lower disk 51 provide keyways parallel to the slots 52 and 53 that receive collars 56 and 57 that are fixed to the shaft 33 and that are provided with flat side faces 58 engaging the sides of the slots 52. The disks 50 and 51 provide support for a drum having a cylindrical body 59 and upper and lower heads 60 and 61 that are journaled on upper and lower ball bearings 62 and 63 that are interposed between the peripheries of the disks 50 and 51 and the heads 60 and 61. The cylindrical body 59 is coaxial with the disks 50 and 51 and adjustable with the disks 50 and 51 to a position in which it is laterally offset with respect to the axis of the shaft 33 so that when the disks 50 and 51 are in eccentric position and the shaft 33 is rotating, the axis of the cylindrical body 59 is caused to have orbital movement about the axis of the shaft 33.

The drum is provided with upper and lower extensions 64 and 65 of reduced diameter that are coaxial with the cylindrical body 59 and that have flanges 66 and 67 attached to the heads 60 and 61. Tubular sleeves 68 and 69 that fit on the extensions 64 and 65 have external circumferential flanges 70 and 71 at their inner ends adjacent the heads 60 and 61. The drum 59 provides support for a normally cylindrical, axially elongated elastic rubber diaphragm 72 that is concentric with the body portion 59 and that is expansible into engagement with the interior of the tire carcass E. The diaphragm 72 has inextensible end beads 73 and 74 that are clamped between the flanges 70 and 71 and flanged sleeves 75 and 76 that telescopically engage end portions of the cylindrical body 59, the sleeves 75 and 76 being secured to the flanges 70 and 71 by means of screws 77 and 78. The sleeves 75 and 76 have a fluid tight fit on the body 59, being mounted on machined end portions 81 and 82 and being provided with sealing rings 83 and 84. The diaphragm 72, the sleeves 75 and 76 and cylindrical body 59 form walls of an annular pressure chamber 85 into which fluid under pressure may be delivered to expand the diaphragm 72 into engagement with the tire carcass E. Air is delivered to the chamber 85 through a tube 86 fixed to the cylindrical body 59 of the drum and a flexible tube 87 attached to the tube 86 that leads to a suitable source of pressure.

Upper and lower expansible elastic rubber stitcher rings 88 and 89 are supported on the upper and lower extensions 64 and 65 of the drum. The rings 88 and 89 are normally of substantially the same external diameter as the diaphragm 72 and are expanded by means of inflatable endless tubes 90 and 91 interposed between the interiors of the rings 88 and 89 and the sleeves 68 and 69. The rings 88 and 89 are mounted between the outwardly projecting flanges 70 and 71 of the sleeves 68 and 69 and flat rings 92 and 93 that form the outer walls of confining channels, the rings 92 and 93 being secured by screws 94 and 95 to collars 96 and 97 that fit on the drum extensions 64 and 65. Split locking rings 98 and 99 secure the rings 92 and 93 to the sleeves 68 and 69. The lower stitcher ring 89 is held in fixed position by means of bolts 100 that attach the collar 96 to the lower drum extension 64. The upper stitcher ring 88 and sleeve 68 upon which it is mounted are adjustable axially on the extension 64, the collar 96 having an integral lug 101 that extends radially inwardly through a longitudinal slot 102 in the extension 64 which is engaged by an axially extending adjusting screw 103 carried by the extension 64. By adjustment of the screws 103 sufficient tension may be applied to the tubular diaphragm 72 to normally hold it in substantially cylindrical form and any permanent stretch in the diaphragm due to repeated use can be taken up.

A fitting 104 is provided for admitting fluid under pressure to the upper inflatable tube 90. The fitting 104 is connected by a flexible tube 105 to a tube 106 attached to the interior of the drum wall 59 and extending to the lower end thereof. The lower end of the tube 106 is connected by a flexible tube 107 to a source of fluid under pressure. The fluid under pressure is admitted to the lower inflatable tube 91 through a fitting 108 connected by a flexible hose 109 to a suitable fluid under pressure. Suitable valves (not shown) are provided for controlling the delivery of fluid under pressure and exhaust of fluid from the chamber 85 and the inflatable tubes 90 and 91. The expansible rubber rings 88 and 89 are provided with central circumferential grooves 110 and 111 which receive elastic rubber rings 112 and 113 that are less stretchable than the rubber rings 88 and 89 and which serve to limit expansion of the rings 88 and 89.

The disks 50 and 51 and the drum carried thereby are moved to their eccentric position by actuation of a rod 114 that is slidably mounted in the tubular drive shaft 33. The rod 114 is actuated by means of a piston 115 attached to the lower end thereof and slidable in a fluid pressure cylinder 116 attached to the lower end of the shaft 33. The cylinder 116 has an upper head 117 secured to the lower end of the shaft 33 and a lower head 118 that is attached to the head 117 by means of tie bolts 119. A fluid pressure conduit 120 is connected to the head 118 centrally thereof by means of a suitable rotary air seal 121 that maintains the connection between the conduit 120 and the cylinder 116 while the shaft 33 is rotating. The rod 114 and piston 115 are held in their lowermost position by means of a spring 122 mounted in the tubular shaft 33 above the upper end of the rod and interposed between the upper end of the rod 114 and the lower end of a plug 123 detachably mounted in the upper end of the tubular shaft 33. A collar 124 is slidably mounted on the shaft 33 between the bearing disks 50 and 51 as best shown in Fig. 5, by means of bolts 125 and 126 that extend through diametrically opposite key blocks 127 and 128 that are slidably mounted in axial slots 129 and 130 in the shaft 33, so that the rod 114 and the collar 124 are constrained to rotate with the shaft 33 and are simultaneously movable axially of the shaft. The collar 124 carries diametrically opposite trunnions 131 and 132 which carry vertical bars 133 pivoted at their centers to the trunnions. The opposite ends of the bars 133 are pivotally connected to inwardly extending arms 134 and 135 of upper and lower bell crank levers 136 and 137 that are connected by pivots 138 and 139 to collars 140 and 141 fixed to the shaft 33. Links 142 and 143 connect the bell cranks 136 and 137 to the bearing disks 50 and 51 to impart equal movements in the same direction to both bearing members upon actuation of the rod 114.

In the practice of the present invention a ring of unvulcanized rubber of a volume to fill the cavity of the mold in which the covering band A is formed is placed in the annular trough member 5 of the mold member 3 on the movable platen 1 of the molding press C. Pressure is then admitted to the cylinders 12 to lift the turret 9 and bring one of the tubular mold members B into engagement with the closure plate 6 on the head 2, after which the press C is actuated to lift the platen 1, enter the cylindrical core 4 into the tubular mold member B and engage the plunger portion 11 of the mold member B with the rubber in the trough 5 to cause the rubber to flow upwardly into the mold cavity.

After each molding operation the turret 9 is indexed to position the tubular mold member with the molded covering band therein in a mold stripping position laterally clear of the press where it is vertically alined with the tread band extractor D. A tire carcass E of substantially cylindrical form is placed upon the extractor D while the extractor is supported in laterally inclined position as shown in dotted lines in Fig. 1, the tire carcass being supported on the radial arms 20 in a position surrounding the expansible tubular diaphragm 72 and the expansible stitcher rings 88 and 89 that are positioned adjacent opposite ends of the diaphragm 72. The extractor D and tire carcass E are then moved to vertical position and moved upwardly into the mold member B to a position where the tread portion $a^1$ of the covering band A surrounds the diaphragm 72 and the side wall covering portions $a^2$ surround the expansible rings 88 and 89.

The carcass E is positioned on the extractor D substantially concentrically with the tubular diaphragm 72 which is initially disposed in a position coaxial with the mold member B and covering band A, with its upper and lower beads e above and below the upper and lower ends of the covering band A. The relative sizes of the covering band and tire carrier are such that a substantial clearance, preferably ½ to ¾" is provided between them. Fluid under pressure is admitted to the chamber 85 through the tubes 86 and 87 to expand the diaphragm 72 into engagement with the central portion of the tire carcass E and to expand the tire carcass into engagement with the central tread forming portion $a^1$ of the covering band A and to exert a radial upward pressure thereon sufficient to firmly adhere the central tread forming portion of the covering band to the central portion of the tire carcass. Fluid under pressure is then admitted to the cylinder 115 to lift the rod 114 and collar 124 to shift the bearing disks 50 and 51 and the drum journaled thereon radially to an eccentric position with respect to the shaft 33. The shaft 33 is then driven by the motor 43 to rotate the eccentrically positioned bearing disks 50 and 51 within the annular drum heads 60 and 61 to impart an orbital movement to the axis of the drum while it is held against rotation by engagement of the diaphragm 72 with the tire carcass E and the engagement of the tire carcass E with the interior of the covering band A in the mold member B. The control of the drive mechanism for the shaft 33 may be connected to the valve controlling delivery of pressure to the cylinder 115 to start rotation of the shaft simultaneously with the movement of the drum to eccentric position if desired. However, such connection is not essential.

Shortly after rotation is started, fluid under pressure is admitted to the inflatable tubes 90 and 91 to expand the stitcher rings 88 and 89 into engagement with the portions of the tire carcass adjacent the beads e to expand the end portions of the tire carcass into engagement with the side wall covering portions $a^2$ of the covering band A. Substantially simultaneously with the delivery of fluid under pressure to the tubes 90 and 91, fluid is allowed to escape from the chamber 85 to gradually decrease the pressure on the diaphragm 72. The diaphragm 72 and the stitcher rings 88 and 89 when expanded exert a radial outward pressure on the tire carcass E to expand it and press it against the interior of the molded covering band A within the tubular mold member B, and rotation of the shaft 33 with the diaphragm 72 and rings 88 and 89 supported eccentrically with respect thereto causes areas of differing radial pressure to shift progressively around the interior of the mold member B and, as the inflation pressure is decreased, a zone of inward radial thrust is created that acts on the covering band progressively throughout the circumference thereof due to the orbital movement of the axis of the diaphragm supporting drum to free the tread portion of the covering band from the interior of the mold member. By relieving the pressure on the diaphragm 72 while pressure is being applied to the stitching rings 88 and 89, the tread forming portion $a^1$ of the covering band A will be loosened from the recessed portions of the mold member B while the thin wall covering end portions $a^2$ are being adhered to the end portions of the tire carcass. After a limited number of turns of the shaft 33, five or six turns being usually sufficient, the pressure in the chamber 5 and in the upper inflatable tube 90 is completely released and the pressure in the lower inflatable tube 91 is partially released to cause the tire carcass and covering band A adhered thereto to shrink sufficiently to free the covering band from the mold. The extractor D is then lowered to withdraw the assembled tire from the mold member B, sufficient pressure being retained in the lower inflatable tube 91 to maintain the lower stitcher ring 89 against the interior of the carcass E above the lower bead e, to prevent displacement of the tire with respect to its support which might bring portions of the covering band into contact with the interior of the mold member and mar the surface thereof during withdrawal.

While the turret 9 is held in fixed position a covering band A may be molded in the press while a previously molded band A is being applied to a tire carcass E on the extractor D.

It is to be understood that in accordance with the provisions of the patent statutes, variations and modifications

What I claim is:

1. The herein described method of extracting a tread forming covering band of uncured rubber that is of substantially internally cylindrical form from the interior of a tubular mold member having an interior circumferential recess that conforms to the tread portion of said band and applying said band to a rubber and fabric tire carcass which comprises supporting said tire carcass in a position surrounding an elongated pressure applying member having a rigid body portion and an elastic radially expansible peripheral wall, axially alining the body portion of said pressure applying member with a tubular mold member having a covering band therein and moving said pressure applying member and tire carcass axially into a position within said mold member, applying fluid pressure to said expansible wall to expand the same into engagement with said tire carcass and to expand said carcass into engagement with said covering band to adhere said band to said tire carcass, moving the body portion of said pressure applying member laterally to position its axis parallel to and spaced from the axis of said mold member, imparting an orbital movement to the axis of said pressure applying member about the axis of said mold member while gradually relieving the expanding pressure on the tire carcass to permit contraction of said elastic wall and to apply radial forces to said band progressively about its circumference to relieve adhesion between said band and said mold member, returning the body portion of said pressure applying member to a position coaxial with said mold member, and withdrawing said tire carcass and adhered covering band axially from said mold member.

2. The herein described method of extracting a covering band of uncured rubber that is of substantially cylindrical internal form and that is formed externally to provide a central tread portion and wall covering end portions of less thickness than said tread portion from the interior of a tubular mold member that has an interior circumferential recess that conforms to said tread forming portion and applying said band to a rubber and fabric tire carcass which comprises supporting said carcass in a position with its central portion surrounding and substantially coaxial with an inflatable annulus having a rigid body portion and a flexible radially expansible exterior wall, moving said tire carcass and annulus axially into a tubular mold member having a covering band therein, supplying fluid under pressure to said inflatable annulus to expand the exterior wall thereof against the interior of the tire carcass to expand it against and adhere it to the tread portion of said covering band, moving the body portion of said annulus laterally to space its axis from the axis of said tubular mold member, gradually relieving the fluid pressure in said annulus while moving the axis of the body portion of the annulus orbitally around the axis of said tubular mold member to apply radial forces progressively to the tread portion of the covering band to relieve adhesion between said portion of the band and the mold member, applying radial pressure to end portions of the tire carcass to adhere them to the side wall covering portions of the covering band, returning the interior portion of said inflatable annulus to a position coaxial with said tubular mold member, relieving the radial pressure on the tire carcass and withdrawing the same with the covering band from the interior of said mold member.

3. The herein described method of extracting a molded covering band of uncured rubber that is of substantially cylindrical internal form that has a central circumferential tread forming portion and side wall covering end portions of less radial thickness than said tread forming portion from the interior of a tubular mold member that has an interior circumferential recess that conforms to said tread forming portion and applying said band to a rubber and fabric tire carcass which comprises supporting said tire carcass in a position surrounding an elongated annular pressure applying member provided with a peripheral wall having independently expansible center and end portions, axially alining said pressure applying member with a tubular mold member having a covering band therein, moving said pressure applying member with a tire carcass thereon axially into the mold member to a position in which the tread portion of the covering band surrounds said central expansible portion of said peripheral wall and the side wall covering portions of the band surround said expansible end portions of said wall, applying fluid pressure to said central portion of said peripheral wall to expand the same into engagement with the tire carcass and the tire carcass into engagement with the interior of the tread forming portion of said band, moving said pressure applying member laterally to position its axis parallel to and spaced from the axis of said mold member, imparting an orbital movement to the axis of said pressure applying member about the axis of said mold member while gradually relieving the expanding pressure on the tire carcass to permit contraction thereof and apply radial forces to the tread portion of said band progressively about its circumference to relieve adhesion between said band and said mold member and simultaneously applying expanding pressure to the expansible end portions of said peripheral wall to press the tire carcass against the interior of the side wall covering portions of said covering band, returning said pressure applying member to a position coaxial with said mold member and further relieving the expanding pressure on said tire carcass, and withdrawing said carcass and adhered covering band axially from said mol dmember.

4. The method according to claim 3 in which the pressure applying member with the tire carcass and adhered covering band thereon is removed axially from the mold and in which the expansible portion at the end of the pressure applying member first withdrawn from the mold member is expanded against the interior of the tire carcass during withdrawal of the supporting member and tire carcass from the mold.

5. Apparatus for extracting a substantially internally cylindrical covering band of uncured rubber from the interior of a tubular mold member and applying the same to the exterior of a substantially cylindrical rubber and fabric tire carcass comprising an axially elongated pressure applying member having a rigid body portion and a flexible elastic and radially expansible peripheral wall, means for supporting a tire carcass in a position surrounding said peripheral wall, means for supporting the body portion of said pressure applying member and said tubular mold member in axial alinement and for relative axial movement to permit movement of said pressure applying member with a tire carcass into said tubular mold member, means for applying fluid under pressure to said expansible wall to expand the same against the interior of said tire carcass and to expand the tire carcass against the interior of said covering band and for controlling the release of pressure, means for shifting the body portion of said pressure applying member laterally to a position where its axis is spaced from the axis of said mold member, and means for moving the axis of the body portion of said pressure applying member orbitally about the axis of said tubular member while expanding fluid pressure is maintained on said elastic peripheral wall.

6. Apparatus for extracting a substantially internally cylindrical covering band of uncured rubber from the interior of a tubular mold member and applying the same to a rubber and fabric tire carcass comprising a rotatable supporting shaft having spaced bearing members mounted thereon for rotation therewith and for movement laterally with respect thereto, a drum having heads concentric with said bearing members and journaled thereon and a flexible elastic and expansible peripheral wall, means for supporting a tire carcass in a position surrounding said peripheral wall, means for applying fluid under pressure to said peripheral wall to expand it against the interior of said tire carcass and for controlling the release of pressure, means for simultaneously moving said bearing members laterally with respect to said shaft to position said drum with its axis spaced from said shaft, and means for rotating said shaft to impart an orbital movement to the axis of said drum about the axis of said shaft.

7. Apparatus according to claim 6 in which the supporting means for the tire carcass comprises arms attached to the drum and projecting radially past the peripheral wall of the drum.

8. Apparatus for extracting a substantially internally cylindrical covering band of uncured rubber from the interior of a tubular mold member and applying the same to a rubber and fabric tire carcass comprising a rotatable supporting shaft having spaced bearing members mounted thereon for rotation therewith and for movement laterally with respect thereto, a drum having heads concentric with said bearing members and journaled thereon, said drum having a peripheral portion providing a central annular axially elongated pressure chamber having an axially elongated normally cylindrical thin flexible elastic expansible exterior wall and annular pressure chambers at opposite ends of said elongated chamber provided with flexible and expansible exterior walls, means for supporting said mold member and shaft in upright position and in axial alinement, means carried by the lower end of said drum for supporting a tire carcass in a position surrounding said drum, means for independently supplying pressure to and exhausting pressure from each of said pressure chambers, means for simultaneously shifting said bearing members laterally with respect to said shaft to position the axis of said drum laterally of the axis of said shaft, and means for rotating said shaft to move the axis of said drum orbitally about the axis of said shaft.

9. Apparatus according to claim 8 in which the expansible walls of the end pressure chambers are in the form of expansible and contractible rubber rings.

10. Apparatus according to claim 9 in which the end pressure chambers are in the form of endless inflatable tubes.

11. Apparatus for extracting a substantially internally cylindrical covering band of uncured rubber from the interior of a tubular mold member and applying the same to a rubber and fabric tire carcass comprising a rotatable supporting shaft having spaced bearing members mounted thereon for rotation therewith and for movement laterally with respect thereto, a drum having heads concentric with said bearing members and a cylindrical body attached at its ends to said heads, sleeves telescopically engaging end portions of said cylindrical body and each provided with a circumferential outwardly projecting flange, an elongated tubular elastic rubber pressure applying member having end portions attached to said sleeve flanges, said cylindrical body, sleeves and tubular elastic rubber member providing a radially expansible pressure chamber, means for supplying pressure to and exhausting pressure from said pressure chamber, means for shifting said bearing members and drum laterally with respect to said shaft, and means for rotating said shaft to move the axis of said drum orbitally about the axis of said shaft.

12. Apparatus according to claim 11 in which means is provided for axially adjusting one of the sleeves to which the tubular elastic wall is attached to maintain an endwise tension on said tubular elastic member.

13. Apparatus according to claim 11 in which the elastic tubular rubber wall has inextensible bead rings embedded in its ends and clamped to the flanges of the sleeves.

14. Apparatus for extracting a substantially internally cylindrical covering band of uncured rubber from the interior of a tubular mold member and applying the same to a rubber and fabric tire carcass comprising a rotatable supporting shaft having spaced bearing members mounted thereon for rotation therewith and for movement laterally with respect thereto, a drum having heads concentric with said bearing members and a cylindrical body attached at its ends to said heads and provided with extensions of reduced diameter, sleeves telescopically engaging end portions of said cylindrical body and each provided with a circumferential outwardly projecting flange, an elongated tubular elastic rubber pressure applying member having end portions attached to said sleeve flanges, said cylindrical body, sleeves and elastic rubber member providing a radially expansible pressure chamber, a radially expansible inflatable annulus mounted on each of said drum extensions, each having a flexible peripheral pressure applying member normally of the same external diameter as said tubular pressure applying member, means for supplying fluid under pressure independently to said expansible pressure chamber and to said inflatable annuli, means for moving said bearing members and drum laterally with respect to said shaft, and means for rotating said shaft to move the axis of said drum orbitally about the axis of said shaft.

15. Apparatus according to claim 14 in which one of the inflatable annuli is attached to one of the sleeves telescopically mounted on the adjacent end of the drum and in which means is provided for axially adjusting said inflatable annulus and attached sleeve to vary the effecting length of the expansible drum periphery.

References Cited in the file of this patent

UNITED STATES PATENTS

| | | |
|---|---|---|
| 2,476,884 | Maynard | July 19, 1949 |
| 2,649,891 | Hinman | Aug. 25, 1953 |